(12) United States Patent
Steiner

(10) Patent No.: US 11,161,479 B2
(45) Date of Patent: Nov. 2, 2021

(54) WINDSCREEN WIPER DEVICE

(71) Applicant: FEDERAL-MOGUL S.A., Aubange (BE)

(72) Inventor: Elodie Steiner, Herserange (FR)

(73) Assignee: Trico Belgium SA, Aubange (BE)

( * ) Notice: Subject to any disclaimer, the term of this patent is extended or adjusted under 35 U.S.C. 154(b) by 50 days.

(21) Appl. No.: 16/484,867

(22) PCT Filed: Feb. 10, 2017

(86) PCT No.: PCT/EP2017/053071
§ 371 (c)(1),
(2) Date: Aug. 9, 2019

(87) PCT Pub. No.: WO2018/145764
PCT Pub. Date: Aug. 16, 2018

(65) Prior Publication Data
US 2020/0070780 A1   Mar. 5, 2020

(51) Int. Cl.
*B60S 1/38*   (2006.01)

(52) U.S. Cl.
CPC ............ *B60S 1/3848* (2013.01); *B60S 1/381* (2013.01); *B60S 2001/3836* (2013.01)

(58) Field of Classification Search
CPC ...... B60S 1/381; B60S 1/3808; B60S 1/3848; B60S 2001/3836
See application file for complete search history.

(56) References Cited

U.S. PATENT DOCUMENTS

2013/0247325 A1 * 9/2013 Boland ................. B60S 1/3877
15/250.201

FOREIGN PATENT DOCUMENTS

| DE | 102005009205 | 10/2005 |
|---|---|---|
| DE | 102005053811 | 5/2007 |
| DE | 102012205783 | 10/2013 |
| DE | 102013204379 | 9/2014 |
| WO | 2008126406 | 10/2008 |

OTHER PUBLICATIONS

EP0743231A1 (machine translation) (Year: 1996).*

* cited by examiner

*Primary Examiner* — Andrew A Horton
(74) *Attorney, Agent, or Firm* — Miller Canfield

(57) ABSTRACT

A windscreen wiper device of the flat blade type is provided comprising a carrier element, and a wiper blade with a wiping part that can be placed in abutment with a windscreen, which includes at least one longitudinal groove in which a strip of the carrier element is disposed. The wiper blade comprising a connecting device for an oscillating arm that can be pivotally connected to the connecting device. The wiper blade includes a wiping part with a free end to be placed in abutment with a windscreen. The wiping part is arranged to carry out oscillatory tilting movement along a first tilting web. The wiper blade includes damping strips to damp oscillatory movement of the wiping part. The damping strips move along a second tilting web. The damping strips each include protrusions to contact a bottom of the holding part to limit oscillatory movement of the wiping part.

10 Claims, 2 Drawing Sheets

WINDSCREEN WIPER DEVICE

BACKGROUND OF THE INVENTION

The present invention relates to a windscreen wiper device of the flat blade type comprising an elastic, elongated carrier element, as well as an elongated wiper blade of a flexible material, wherein the wiper blade comprising a holding part with at least one longitudinal groove, in which groove a longitudinal strip of the carrier element is disposed. The wiper blade comprising a connecting device for an oscillating arm, wherein the oscillating arm can be pivotally connected to the connecting device about a pivot axis near one end thereof, wherein the wiper blade further comprises a wiping part with a free end to be placed in abutment with a windscreen to be wiped, the wiping part being arranged to carry out an oscillatory tilting movement along a tilting web between reversal positions thereof, the wiper blade further comprising opposite, sidewardly extending damping strips being arranged to damp the oscillatory movement of the wiping part by contacting the wiping part along a contact surface thereof.

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature.

SUMMARY OF THE INVENTION

The object of the invention is to provide an improved windscreen wiper device.

In order to accomplish that objective, a windscreen wiper device of the type referred to in the introduction is characterized according to the invention in that the wiping part is arranged to carry out the oscillatory tilting movement along a first tilting web (facing towards a windscreen to be wiped) interconnecting the dampening strips and the wiping part, wherein the damping strips are arranged to carry out a corresponding oscillatory tilting movement along a second tilting web (facing away from a windscreen to be wiped) interconnecting the dampening strips and the holding part,
   wherein the damping strips are each provided with an upwardly extending protrusion arranged to contact a bottom of the holding part along a contact surface thereof in order to limit the oscillatory movement of the wiping part during wiping (i.e. between its reversal positions), and/or
   the bottom of the holding part comprises opposite, downwardly extending protrusions arranged to contact the damping strips along a contact surface thereof in order to limit the oscillatory movement of the wiping part during wiping (i.e. between reversal positions), wherein, seen in cross-section of the wiper blade, the contact surface between the damping strips and the wiping part and the contact surface between the damping strips and the bottom of the holding part are aligned along a line perpendicular to a windscreen to be wiped.

During wiping the wiping part, also referred to as wiping lip, is into contact with one of the damping strips. The advantage is that the so-called "reversal noise" of the wiping element during the oscillatory movement is reduced. During reversal the damping strip is subsequently deformed until this damping strip comes to rest on the bottom of the holding part. In other words, during wiping either in a first preferred embodiment the upwardly extending protrusion on this damping strip contacts the bottom of the holding part or in a second preferred embodiment the downwardly extending protrusion on the bottom of the holding part contacts this damping strip. In both embodiments the contact surface between the damping strips and the wiping part and the contact surface between the damping strips and the bottom of the holding part are aligned along a line perpendicular to a windscreen to be wiped. Hence, the transfer of forces or resultant force between the holding part, the damping strip and the wiping part is directed in vertical direction. This improves the stability of the wiping lip, so that the contact angle thereof with a windscreen to be wiped is constant, independent of any variation in forces exerted by the oscillating arm on the wiper blade.

In a preferred embodiment of a windscreen wiper device in accordance with the invention the holding part comprises two opposite longitudinal grooves open at a longitudinal side thereof, and wherein in each groove a longitudinal strip of the carrier element is disposed.

In another preferred embodiment of a windscreen wiper device according to the invention the holding part comprises a central longitudinal groove with a closed circumference, and wherein in the groove a longitudinal strip of the carrier element is disposed. Particularly, the groove is dome-shaped, wherein the groove extends in upward direction above the longitudinal strip for forming a longitudinal hollow channel defined by the longitudinal strip and an upper surface of the groove.

In another preferred embodiment of a windscreen wiper device in accordance with the invention the wiper blade is made in one piece of material, more preferably through extrusion.

In another preferred embodiment of a windscreen wiper device according to the invention the wiping part has a triangular cross-section having opposite shoulders, and wherein the shoulders form the contact surfaces of the wiping part with the damping strips.

In another preferred embodiment of a windscreen wiper device in accordance with the invention the wiper blade is provided with a spoiler at a side thereof facing away from a windscreen to be wiped.

In another preferred embodiment of a windscreen wiper device according to the invention only the protrusions contact the holding part and/or the damping strips.

In another preferred embodiment of a windscreen wiper device in accordance with the invention during reversal the wiping part is arranged to first contact the damping strip and subsequently the combination of the damping strip and the holding part.

In another preferred embodiment of a windscreen wiper device according to the invention the stiffness of the damping strips is lower than the stiffness of the holding part.

BRIEF DESCRIPTION OF THE DRAWINGS

The invention will now be explained more in detail with reference to figures illustrated in a drawing, wherein.

DETAILED DESCRIPTION OF THE PREFERRED EMBODIMENTS

Figure 1:
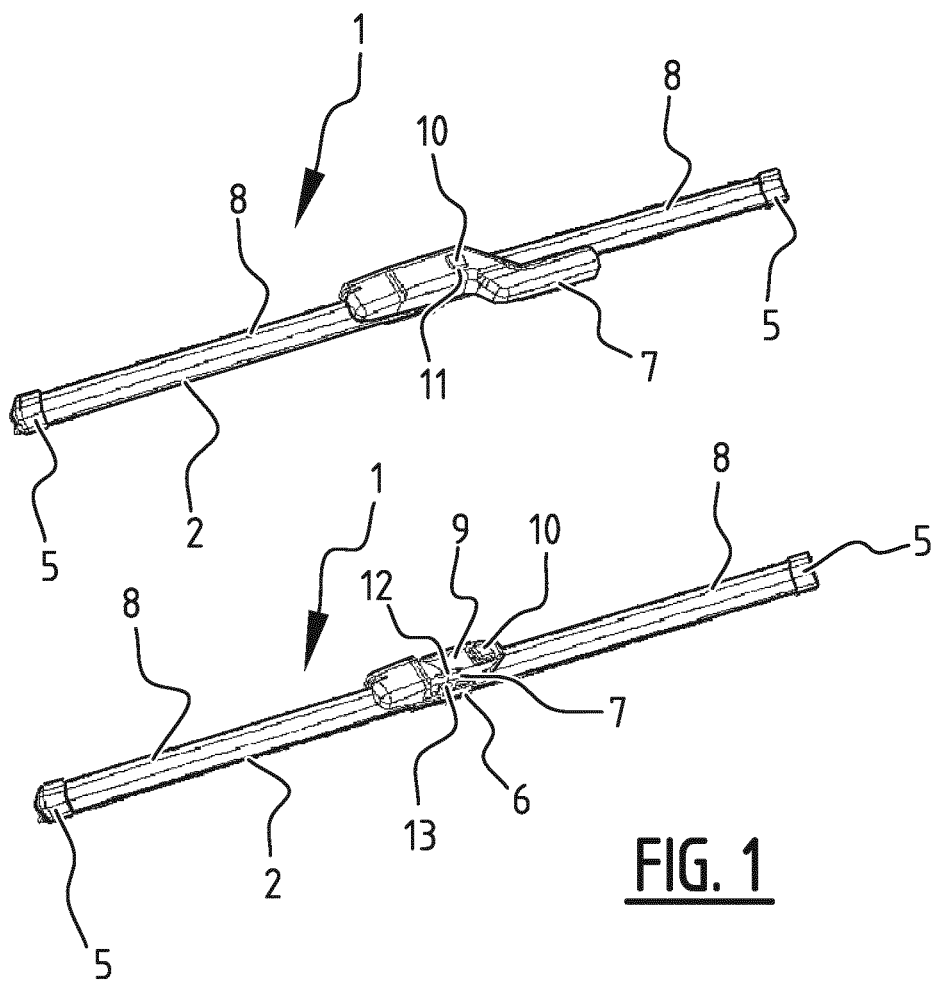
FIG. 1 is a perspective, schematic view of a preferred embodiment of a windscreen wiper device according to the invention, with and without an oscillating arm, respectively.

FIG. 1 shows a preferred variant of a windscreen wiper device 1 according to the invention. The windscreen wiper device is built up of an elastomeric wiper blade 2 comprising a central or middle longitudinal groove 3, wherein a central or middle longitudinal strip 4 made of spring band steel is fitted in the longitudinal groove 3 (see FIGS. 2 through 4). The strip 4 forms a flexible carrier element for the rubber wiper blade 2, as it were, which is thus biased in a curved position (the curvature in operative position being that of a windscreen to be wiped). An end of the strip 4 and/or an end of the wiper blade 2 is connected on either side of the windscreen wiper device 1 to respective connecting pieces or "end caps" 5. In this embodiment, the connecting pieces 5 are separate constructional elements, which may be form-locked, as well as force-locked to both ends of the strip 4.

In another preferred variant, the connecting pieces 5 are in one piece with the strip 4 made of spring band steel. The windscreen wiper device 1 is furthermore built up of a connecting device 6 for connecting an oscillating wiper arm 7 thereto. The oscillating wiper arm 7 is pivotally connected to the connecting device 6 about a pivot axis near one end. The preferred embodiment of FIG. 1 according to the invention comprises a spoiler or "air deflector" 8 which is made in one piece with the rubber wiper blade 2 and which extends along the entire length thereof. The connecting device 6 with the wiper blade 2 is mounted onto the oscillating arm 7 as follows. A joint part 9 being already clipped onto the connecting device 6 is pivoted relative to the connecting device 6, so that the joint part 9 can be easily slid on a free end of the oscillating arm 7. During this sliding movement a resilient tongue 10 of the joint part 9 is initially pushed in against a spring force and then allowed to spring back into the hole 11 of the oscillating arm 7, thus snapping, that is clipping the resilient tongue 10 into the hole 11. This is a so-called bayonet-connection. The oscillating arm 7 together with the joint part 9 may then be pivoted back in a position parallel to the wiper blade 2 in order to be ready for use. By subsequently pushing in again the resilient tongue 10 against the spring force (as if it were a push button), the connecting device 6 and the joint part 9 together with the wiper blade 2 may be released from the oscillating arm 7. Dismounting the connecting device 6 with the wiper blade 2 from the oscillating arm 7 is thus realized by sliding the connecting device 6 and the joint part 9 together with the wiper blade 2 in a direction away from the oscillating arm 7.

The connecting device 6 comprises two cylindrical protrusions 12 extending outwards on either side of the connecting device 6. These protrusions 12 pivotally engage in identically shaped cylindrical recesses 13 of the plastic joint part 9. The protrusions 12 act as bearing surfaces at the location of the pivot axis in order to pivot the joint part 9 (and the oscillating arm 7 attached thereto) about the pivot axis near one end of the oscillating arm 7.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

Figure 2:
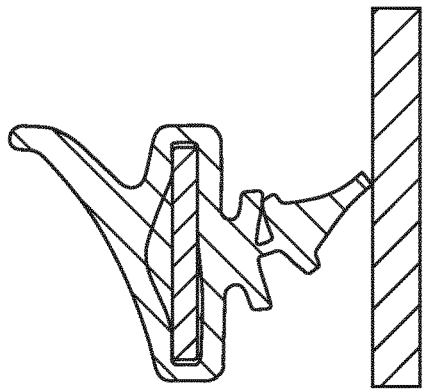
FIG. 2 shows a cross-sectional view of a wiper blade as used in a windscreen wiper device of FIG. 1.
Figure 2:
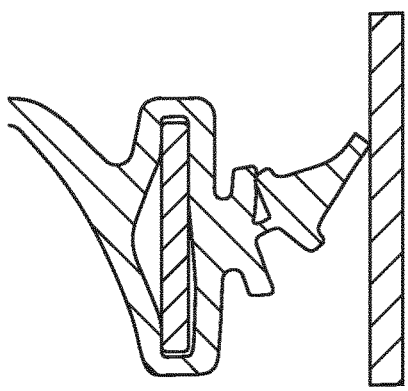
Figure 2:
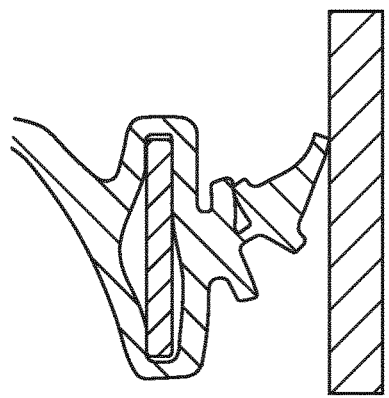
Figure 2:
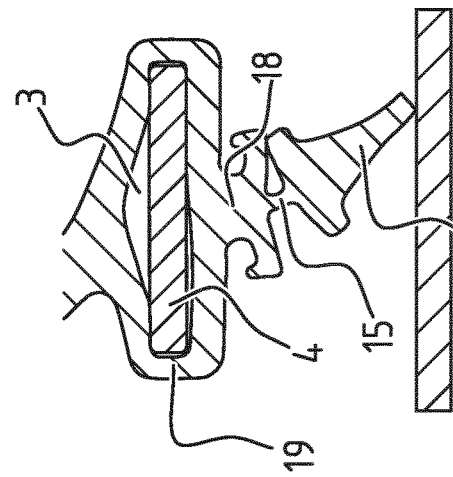
Figure 3:
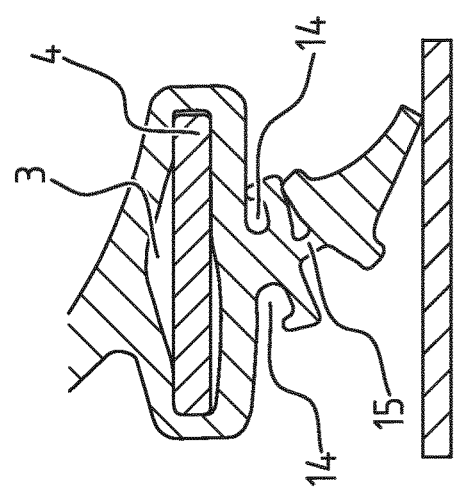
FIG. 3 shows a cross-sectional view of a wiper blade as used in a windscreen wiper device of FIG. 1.
Figure 4:
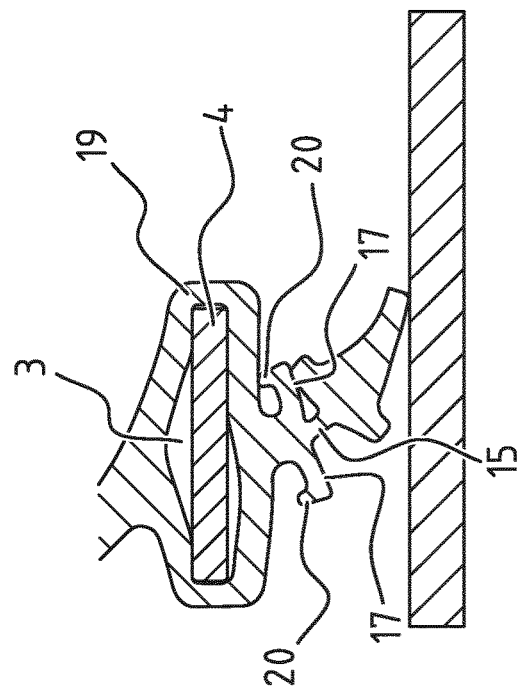
FIG. 4 shows a cross-sectional view of a wiper blade as used in a windscreen wiper device of FIG. 1.

With reference to FIGS. 2 through 4 the wiper blade 2 shown in the upper part of FIGS. 2 through 4 is a wiper blade 2 of the prior art, whereas the wiper blade 2 shown in the lower part of FIGS. 2 through 4 is a wiper blade 2 of the invention.

The wiper blade 2 of the invention comprises two tilting web grooves 14 defining a strip-like tilting web 15 between them, as well as a downwardly extending wiping lip 16 on the tilting web 15. The wiping lip 16 rests with its free end on a windscreen to be wiped. In action the wiping lip 16, as if it were a hinge, tilts in its oscillation reversal positions.

The wiper blade of the invention further comprising opposite, sidewardly extending damping strips 17 being arranged to damp oscillatory movement of the wiping lip 16 by contacting the wiping lip 16 along a contact surface thereof. As shown, the tilting web 15 interconnects the damping strips 17 and the wiping lip 16. The damping strips 17 are arranged to carry out a corresponding oscillatory tilting movement along a further tilting web 18 interconnecting the damping strips 17 and a holding part 19 of the wiper blade 2. As shown, the damping strips 17 are each provided with an upwardly extending protrusion 20 arranged to contact a bottom of the holding part 19 along a contact surface thereof in order to limit the oscillatory movement of wiping lip 16 during wiping.

Seen in cross-section of the wiper blade, the contact surface between the damping strips 17 and the wiping lip 16 on the one hand and the contact surface between the damping strips 17 and the bottom of the holding part 19 are aligned along a line perpendicular to a windscreen to be wiped.

The invention is not restricted to the variants shown in the drawing, but it also extends to other preferred embodiments that fall within the scope of the appended claims.

The invention claimed is:

1. A windscreen wiper device of the flat blade type comprising an elastic, elongated carrier element, as well as an elongated wiper blade of a flexible material, wherein said wiper blade comprising a holding part with at least one longitudinal groove, in which groove a longitudinal strip of the carrier element is disposed, said wiper blade comprising a connecting device for an oscillating arm, wherein said oscillating arm can be pivotally connected to said connecting device about a pivot axis near one end thereof, wherein said wiper blade comprises a wiping part with a free end to be placed in abutment with a windscreen to be wiped, said wiper blade comprising opposite, sidewardly extending damping strips arranged to damp oscillatory tilting movement of the wiping part by contacting the wiping part along a contact surface thereof, said wiping part is arranged to carry out said oscillatory tilting movement along a first tilting web interconnecting the damping strips and the wiping part, wherein said damping strips are arranged to carry out a corresponding oscillatory tilting movement along a second tilting web interconnecting the damping strips and the holding part, wherein said damping strips are each provided with an upwardly extending protrusion arranged to contact a bottom of said holding part along a contact surface thereof in order to limit said oscillatory movement of said wiping part, and wherein the stiffness of the damping strips is lower than the stiffness of the holding part.

2. A windscreen wiper device according to claim 1, wherein and said bottom of said holding part comprises opposite, downwardly extending protrusions arranged to contact said damping strips along a contact surface thereof in order to limit said oscillatory movement of said wiping part.

3. A windscreen wiper device according to claim 1, wherein, seen in cross-section of the wiper blade, a contact surface between the damping strips and the wiping part and the contact surface between the damping strips and the bottom of the holding part are aligned along a line perpendicular to a windscreen to be wiped.

4. A windscreen wiper device according to claim 1, wherein said wiping part has a triangular cross-section having opposite shoulders, and wherein said shoulders form said contact surfaces of the wiping part with said damping strips.

5. A windscreen wiper device according to claim 1, wherein only the protrusions contact the holding part and/or the damping strips.

6. A windscreen wiper device according to claim 1, wherein during reversal the wiping part is arranged to first contact the damping strip and subsequently the combination of the damping strip and the holding part.

7. A windscreen wiper device of the flat blade type comprising an elastic, elongated carrier element, as well as an elongated wiper blade of a flexible material, wherein said wiper blade comprising a holding part with at least one longitudinal groove, in which groove a longitudinal strip of the carrier element is disposed, said wiper blade comprising a connecting device for an oscillating arm, wherein said oscillating arm can be pivotally connected to said connecting device about a pivot axis near one end thereof, wherein said wiper blade comprises a wiping part with a free end to be placed in abutment with a windscreen to be wiped, said wiper blade comprising opposite, sidewardly extending damping strips arranged to damp oscillatory tilting movement of the wiping part by contacting the wiping part along a contact surface thereof, said wiping part is arranged to carry out said oscillatory tilting movement along a first tilting web interconnecting the damping strips and the wiping part, wherein said damping strips are arranged to carry out a corresponding oscillatory tilting movement along a second tilting web interconnecting the damping strips and the holding part, wherein said damping strips are each provided with an upwardly extending protrusion arranged to contact a bottom of said holding part along a contact surface thereof in order to limit said oscillatory movement of said wiping part and said bottom of said holding part comprises opposite, downwardly extending protrusions arranged to contact said damping strips along a contact surface thereof in order to limit said oscillatory movement of said wiping part, wherein, seen in cross-section of the wiper blade, a contact surface between the damping strips and the wiping part and the contact surface between the damping strips and the bottom of the holding part are aligned along a line perpendicular to a windscreen to be wiped, and wherein the stiffness of the damping strips is lower than the stiffness of the holding part.

8. A windscreen wiper device according to claim 7, wherein said wiping part has a triangular cross-section having opposite shoulders, and wherein said shoulders form said contact surfaces of the wiping part with said damping strips.

9. A windscreen wiper device according to claim 7, wherein only the protrusions contact the holding part and/or the damping strips.

10. A windscreen wiper device according to claim 7, wherein during reversal the wiping part is arranged to first contact the damping strip and subsequently the combination of the damping strip and the holding part.

* * * * *